(12) United States Patent
Reuter et al.

(10) Patent No.: US 11,958,451 B2
(45) Date of Patent: Apr. 16, 2024

(54) ELECTRO-HYDRAULIC BRAKE ASSEMBLY

(71) Applicant: BWI (Shanghai) Co., Ltd., Shanghai (CN)

(72) Inventors: David Fredrick Reuter, Beavercreek, OH (US); Dongqiang Luo, Shanghai (CN); Bin Chen, Shanghai (CN); Jian Wu, Shanghai (CN); Daniel Norbert Borgemenke, Springboro, OH (US); Pascal Chaumette, Creteil (FR); Patrick N. Hopkins, Farmington Hills, MI (US)

(73) Assignee: BWI (SHANGHAI) CO., LTD., Shanghai (CN)

( * ) Notice: Subject to any disclaimer, the term of this patent is extended or adjusted under 35 U.S.C. 154(b) by 222 days.

(21) Appl. No.: 17/515,397

(22) Filed: Oct. 29, 2021

(65) Prior Publication Data

US 2022/0161774 A1 May 26, 2022

Related U.S. Application Data

(60) Provisional application No. 63/117,438, filed on Nov. 23, 2020.

(30) Foreign Application Priority Data

Sep. 26, 2021 (CN) .......................... 202111129596.1

(51) Int. Cl.
*B60T 13/66* (2006.01)
*B60T 7/04* (2006.01)
(Continued)

(52) U.S. Cl.
CPC ............ *B60T 13/662* (2013.01); *B60T 7/042* (2013.01); *B60T 13/14* (2013.01); *B60T 13/62* (2013.01);
(Continued)

(58) Field of Classification Search
CPC ... B60T 1/10; B60T 7/042; B60T 8/17; B60T 8/368; B60T 8/40; B60T 8/4018;
(Continued)

(56) References Cited

U.S. PATENT DOCUMENTS 7,926,888 B2   4/2011 Reuter et al.
8,985,713 B2   3/2015 Naito et al.
(Continued)

FOREIGN PATENT DOCUMENTS

CN   102092376 A   6/2011
CN   105722736 A   6/2016
(Continued)

OTHER PUBLICATIONS

Extended European Search Report dated Mar. 25, 2022 for counterpart European patent application No. 21208907.2.
(Continued)

*Primary Examiner* — Robert A. Siconolfi
*Assistant Examiner* — San M Aung
(74) *Attorney, Agent, or Firm* — William H. Honaker; Dickinson Wright PLLC

(57) ABSTRACT

An electro-hydraulic brake assembly comprises a hydraulic control unit (HCU) body having a top surface and a bottom surface opposite the top surface and defining a master cylinder bore and a pressure supply bore. A fluid reservoir is disposed on the top surface. A primary piston is slidably disposed in the master cylinder bore and configured to supply brake fluid to a wheel brake in response to pressing of a brake pedal. A pressure supply unit includes: a pressure supply piston disposed within the pressure supply bore; a motor located on the bottom surface of the HCU body and having a motor shaft. An actuator mechanism includes a threaded shaft configured to be rotated by the motor shaft, and a nut coupled to the pressure supply piston, together
(Continued)

causing the pressure supply piston to translate linearly through the pressure supply bore in response to rotation of the motor shaft.

19 Claims, 14 Drawing Sheets

(51) Int. Cl.

| | | |
|---|---|---|
| *B60T 8/17* | (2006.01) | |
| *B60T 8/40* | (2006.01) | |
| *B60T 13/14* | (2006.01) | |
| *B60T 13/62* | (2006.01) | |
| *B60T 13/74* | (2006.01) | |
| *B60T 17/00* | (2006.01) | |

(52) U.S. Cl.
CPC ............ *B60T 13/745* (2013.01); *B60T 17/00* (2013.01); *B60T 8/17* (2013.01); *B60T 8/4081* (2013.01); *B60T 13/746* (2013.01); *B60T 2220/04* (2013.01); *B60T 2270/402* (2013.01); *B60T 2270/404* (2013.01); *B60T 2270/82* (2013.01)

(58) Field of Classification Search
CPC .... B60T 8/4022; B60T 8/4077; B60T 8/4081; B60T 11/20; B60T 11/203; B60T 13/14; B60T 13/62; B60T 13/162; B60T 13/146; B60T 13/662; B60T 13/745; B60T 13/746; B60T 2220/04; B60T 2270/82; B60T 2270/402; B60T 2270/404
USPC .......................................................... 303/14
See application file for complete search history.

(56) References Cited

U.S. PATENT DOCUMENTS

| | | | |
|---|---|---|---|
| 9,145,119 B2 | 9/2015 | Biller et al. | |
| 9,446,753 B2 | 9/2016 | Feigel et al. | |
| 9,527,485 B2 | 12/2016 | Nakamura et al. | |
| 9,776,604 B2 | 10/2017 | Lee et al. | |
| 9,988,028 B2 | 6/2018 | Oosawa et al. | |
| 10,000,193 B2 | 6/2018 | Han | |
| 10,150,459 B2 | 12/2018 | Weh et al. | |
| 10,207,690 B2 | 2/2019 | Nakazawa et al. | |
| 11,608,044 B2 * | 3/2023 | Weh | B60T 8/4081 |
| 2011/0120121 A1 * | 5/2011 | Sprocq | B60T 13/162 |
| | | | 60/563 |
| 2016/0185329 A1 * | 6/2016 | Lee | B60T 8/4081 |
| | | | 303/10 |
| 2017/0182988 A1 | 6/2017 | Kawakami et al. | |
| 2017/0190328 A1 * | 7/2017 | Nakazawa | B60T 7/042 |
| 2020/0047731 A1 * | 2/2020 | Reuter | B60T 13/146 |
| 2020/0070794 A1 * | 3/2020 | Geider | B60T 11/16 |
| 2020/0139948 A1 | 5/2020 | Eiber et al. | |
| 2020/0172068 A1 | 6/2020 | Leiber et al. | |
| 2020/0298807 A1 * | 9/2020 | Ganzel | B60T 13/62 |
| 2020/0339092 A1 | 10/2020 | Reuter et al. | |
| 2020/0361434 A1 * | 11/2020 | Weh | B60T 8/4018 |

FOREIGN PATENT DOCUMENTS

| | | |
|---|---|---|
| CN | 105752066 A | 7/2016 |
| CN | 108791261 A | 11/2018 |
| CN | 110944890 A | 3/2020 |
| CN | 111348025 A | 6/2020 |
| DE | 102015104246 A1 | 9/2016 |
| DE | 2017212016 A1 | 1/2019 |
| DE | 102017212016 A1 | 1/2019 |
| EP | 3611062 A1 | 2/2020 |
| WO | 2011063955 A2 | 6/2011 |

OTHER PUBLICATIONS

First Office Action and Search Report dated Sep. 28, 2022 for counterpart Chinese Patent Application No. 202111129596.1, along with English machine translation.

Second Office Action and Search Report dated Nov. 18. 2022 for counterpart Chinese Patent Application No. 202111129596.1, along with English machine translation.

\* cited by examiner

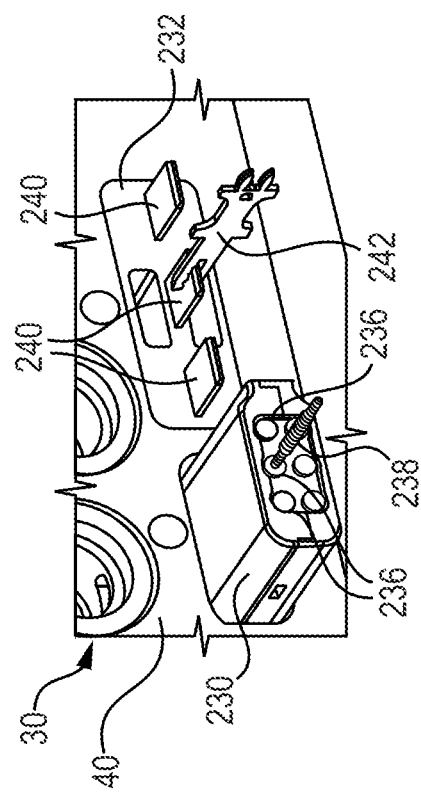
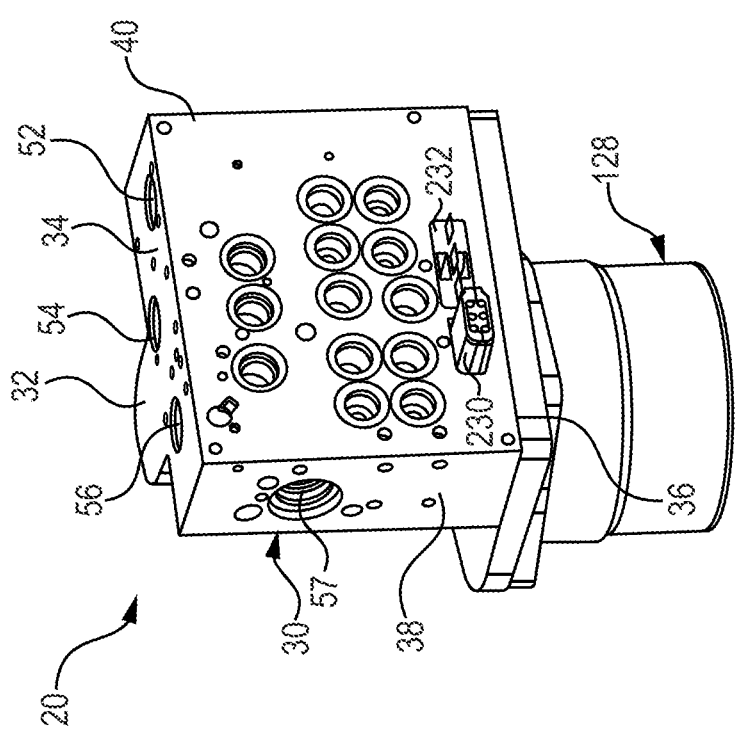

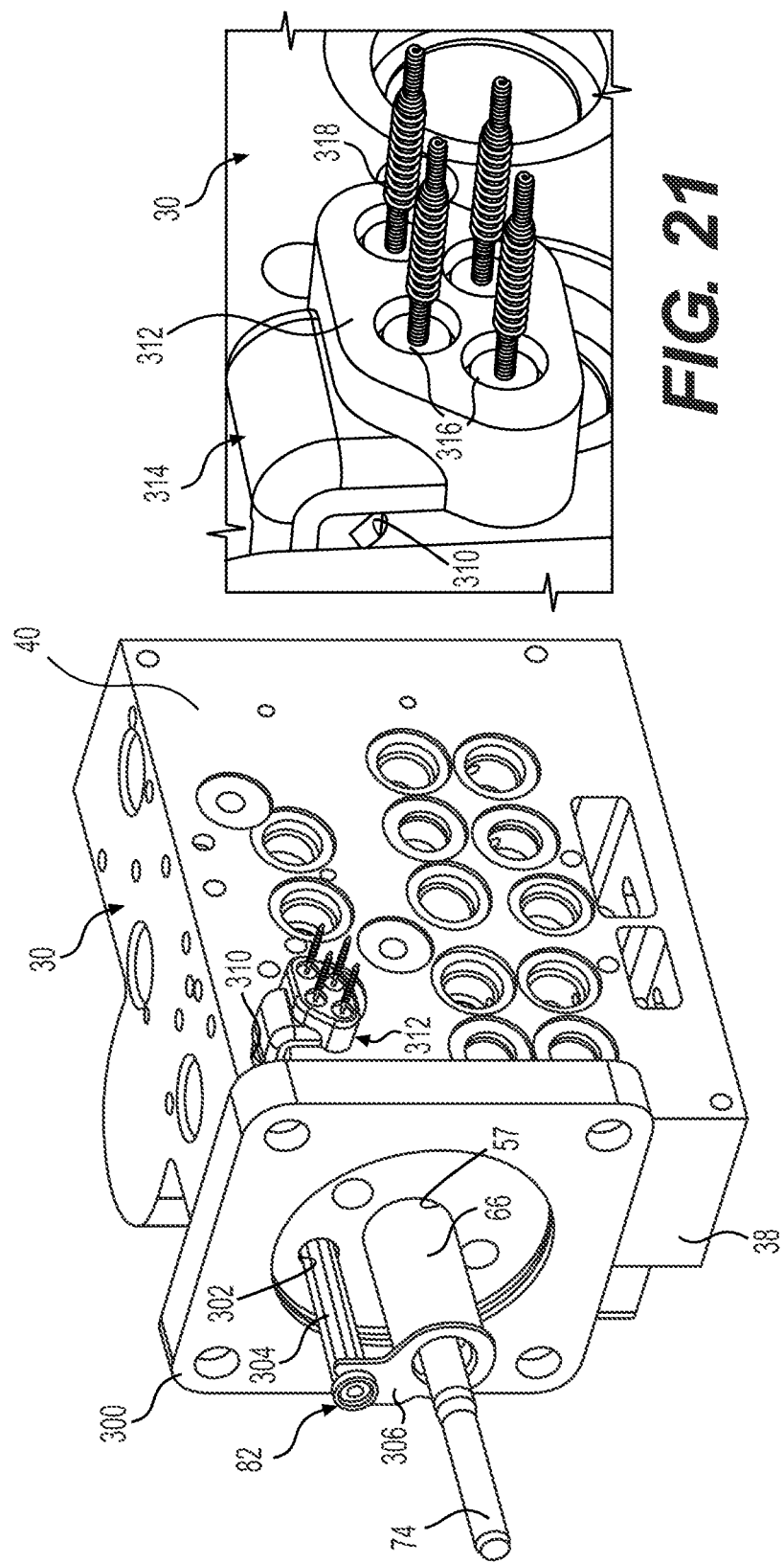

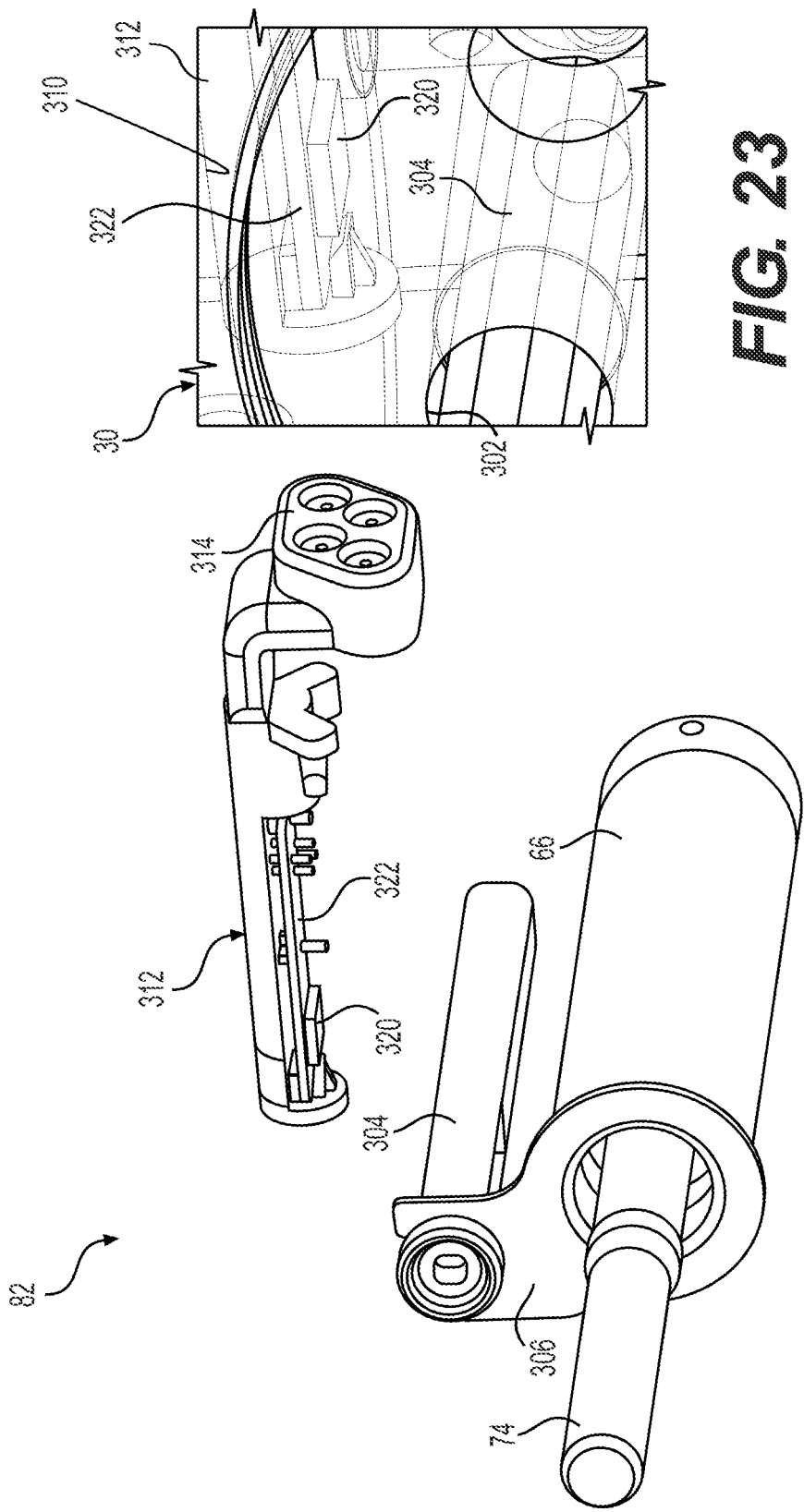

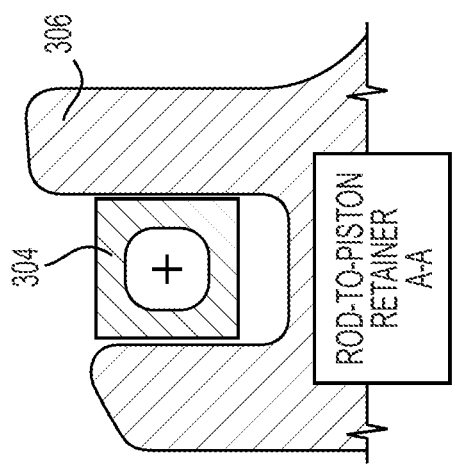
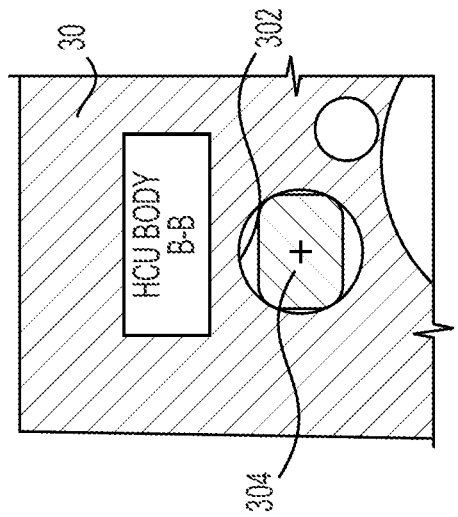
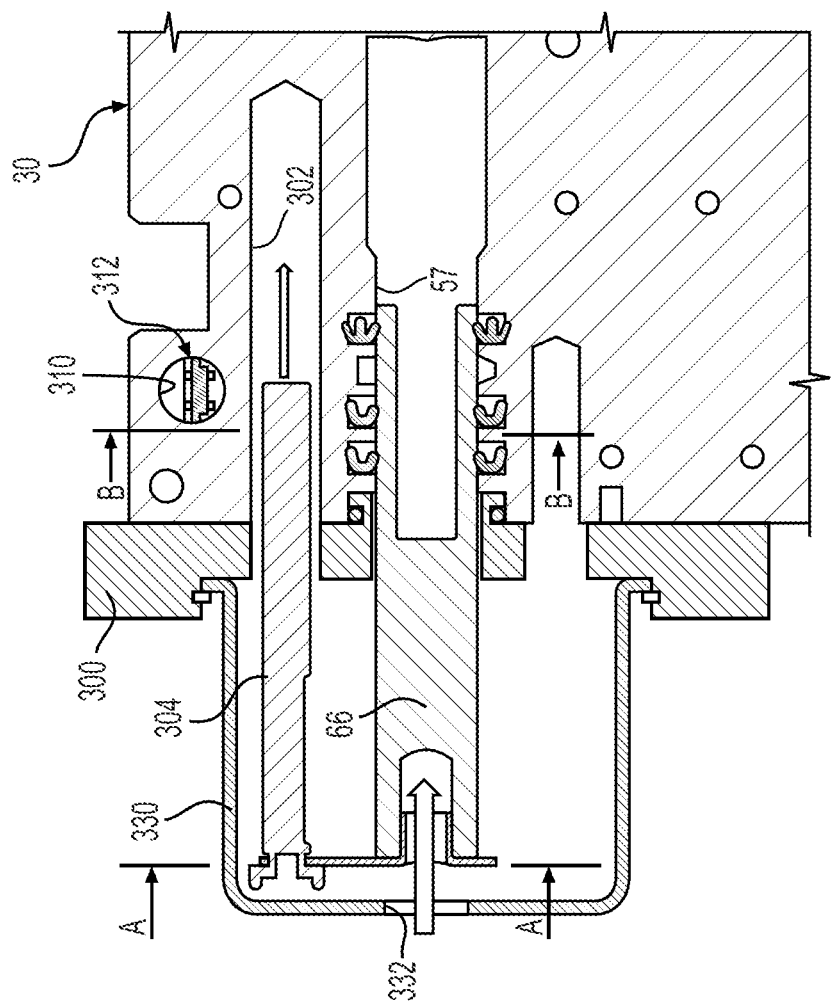

ELECTRO-HYDRAULIC BRAKE ASSEMBLY

CROSS REFERENCE TO RELATED APPLICATIONS

This U.S. utility patent application claims the benefit of U.S. Provisional Patent Application No. 63/117,438, filed Nov. 23, 2020, and Chinese Application No. 202111129596.1 filed Sep. 26, 2021, the contents of which are incorporated herein by reference in their entirety.

BACKGROUND OF THE INVENTION

1. Field of the Invention

The present invention generally relates to an electro-hydraulic brake assembly for controlling wheel brakes of a vehicle.

2. Description of the Prior Art

As electric and hybrid vehicles continue to proliferate in markets around the world, it is well understood that significant lengthening of battery life can be obtained by utilizing the motor-generator output capabilities of that device during braking. However, the input torque in the generator mode used to recharge batteries is not consistent with driver input function of pedal force/travel verses vehicle deceleration. In order to achieve that complex function, the hydraulic brakes of the vehicle must supply the difference between generator braking torque and driver requested braking torque.

The engineering world has understood this requirement for a number of years commonly known as regenerative brake blending. A most efficient way to achieve this is to use a "brake-by-wire" technique. To accomplish this, the brake pedal in effect becomes a joystick, so it must be connected to a travel and/or force sensor in order to send a signal to the system ECU that will interpret this as driver's intent of a desired vehicle deceleration. In addition, the brake pedal "feel" must be simulated by the appropriate force-travel relationship and must also have the ability to be isolated from directly applying the master cylinder to the wheel brakes.

As first noted regarding the proliferation of hybrid and electric vehicles in the world, there is another phenomenon taking place as well, being the push for autonomous, self-driving vehicles. As a result, the Society of Automotive Engineers (SAE) has developed guidelines for the path to autonomy range from level 0 to level 5. Level 0 is no automation. Level 1 is driver assistance required, e.g. adaptive cruise control. Level 2 is partial automation, e.g. Cadillac Super Cruise—driver keep hand on steering wheel. Level 3 is conditional automation, e.g. Audi Traffic Jam Pilot. Level 4 is high automation, e.g. self-driving vehicle with some very specific speed restrictions. Level 5 is full automation where the vehicle can operate at the same level as a human driver.

Brake-by-wire systems having a master brake cylinder and a manifold block are well known. With this type of architecture, individual wheel pressure control is typically handled by the manifold block (also known as the stability control unit). This feature provides functions such as, but not limited to, ABS, traction control, and stability control. In addition, another important function is dynamic rear braking. It is well known in the braking industry that when a vehicle decelerates there is a forward shift in the center of gravity. This necessitates more front brake torque and less rear brake torque to prevent rear wheel lock-up. As the rear wheels are needed to provide vehicle stability, the lock-up of the rear wheels are not permitted under all braking conditions.

One-box brake-by-wire systems are becoming increasingly common. Such one-box systems typically incorporate a master brake cylinder, manifold block, pressure supply unit pedal feel emulator, isolation valves, etc. together in a single integrated assembly. Some existing one-box brake-by-wire systems incorporate other related components, such as a fluid reservoir.

SUMMARY OF THE INVENTION

The present invention provides an electro-hydraulic brake assembly that includes a hydraulic control unit (HCU) body. The HCU body includes a top surface, a bottom surface opposite the top surface, a side surface, and a front surface. The side surface and the front surface extend perpendicular to the top surface, the bottom surface, and to one another. The HCU body defines a pressure supply bore and a master cylinder bore. The electro-hydraulic brake assembly also includes a fluid reservoir disposed on the top surface of the HCU body, an electronic control unit coupled to the front surface, and a primary piston slidably disposed in the master cylinder bore. The primary piston is configured to supply brake fluid to a wheel brake in response to pressing of a brake pedal. The electro-hydraulic brake assembly also includes a pressure supply unit, which includes a pressure supply piston disposed within the pressure supply bore, and a motor having a motor shaft configured to cause the pressure supply piston to translate linearly through the pressure supply bore. The master cylinder bore is defined in the side surface, and the motor is located on the bottom surface of the HCU body.

The present invention also provides an electro-hydraulic brake assembly that includes an HCU body. The HCU body includes a top surface and a bottom surface opposite the top surface. The HCU body defines a master cylinder bore and a pressure supply bore. The electro-hydraulic brake assembly also includes a piston slidably disposed in the master cylinder bore and configured to supply brake fluid to a wheel brake in response to pressing of a brake pedal, and a pressure supply unit. The pressure supply unit includes a pressure supply piston disposed within the pressure supply bore; a motor attached to the HCU body and having a motor shaft; and an actuator mechanism configured to cause the pressure supply piston to translate linearly through the pressure supply bore in response to rotation of the motor shaft. The actuator mechanism includes a threaded shaft configured to be rotated by the motor shaft, a nut coupled to the pressure supply piston, and a plurality of spherical members located between the nut and the threaded shaft for transferring rotation of the threaded shaft to an axial displacement of the nut.

The present invention also provides an electro-hydraulic brake assembly that includes an HCU body. The HCU body includes a top surface and a bottom surface opposite the top surface. The HCU body defines a master cylinder bore and a first sensor bore extending parallel to and spaced apart from the master cylinder bore. The electro-hydraulic brake assembly also includes a primary piston slidably disposed in the master cylinder bore and configured to supply brake fluid to a wheel brake in response to pressing of a brake pedal. The electro-hydraulic brake assembly also includes a pedal travel sensor including a sensor rod slidably disposed in the first sensor bore and connected to move together with the primary piston in respective ones of the first sensor bore and the master cylinder bore. The pedal travel sensor also includes a position detector configured to detect a position of the sensor rod in the first sensor bore, and to thereby determine a position of the primary piston

BRIEF DESCRIPTION OF THE DRAWINGS

Other advantages of the present invention will be readily appreciated, as the same becomes better understood by reference to the following detailed description when considered in connection with the accompanying drawings wherein:

FIG. 9 shows a side perspective view of an HCU body of the electro-hydraulic brake assembly of FIG. 3, with a motor attached to a bottom surface thereof;

FIG. 10 shows an enlarged section of FIG. 9, including motor connector details;

FIG. 20 shows a side perspective view of an HCU body of the electro-hydraulic brake assembly of FIG. 3, with an input flange and a pedal travel sensor;

FIG. 21 shows an enlarged fragmentary view of a pedal travel connector;

FIG. 22 shows a perspective view showing details and relative positions of the pedal travel sensor;

FIG. 23 shows an enlarged fragmentary view showing the pedal travel sensor within the HCU body;

FIG. 24 shows a cross-sectional view of the pedal travel sensor within the HCU body;

FIG. 25 shows an enlarged fragmentary cross-section through plane A-A indicated on FIG. 24; and FIG. 26 shows an enlarged fragmentary cross-section through plane B-B indicated on FIG. 24.

DESCRIPTION OF THE ENABLING EMBODIMENT

Figure 1:
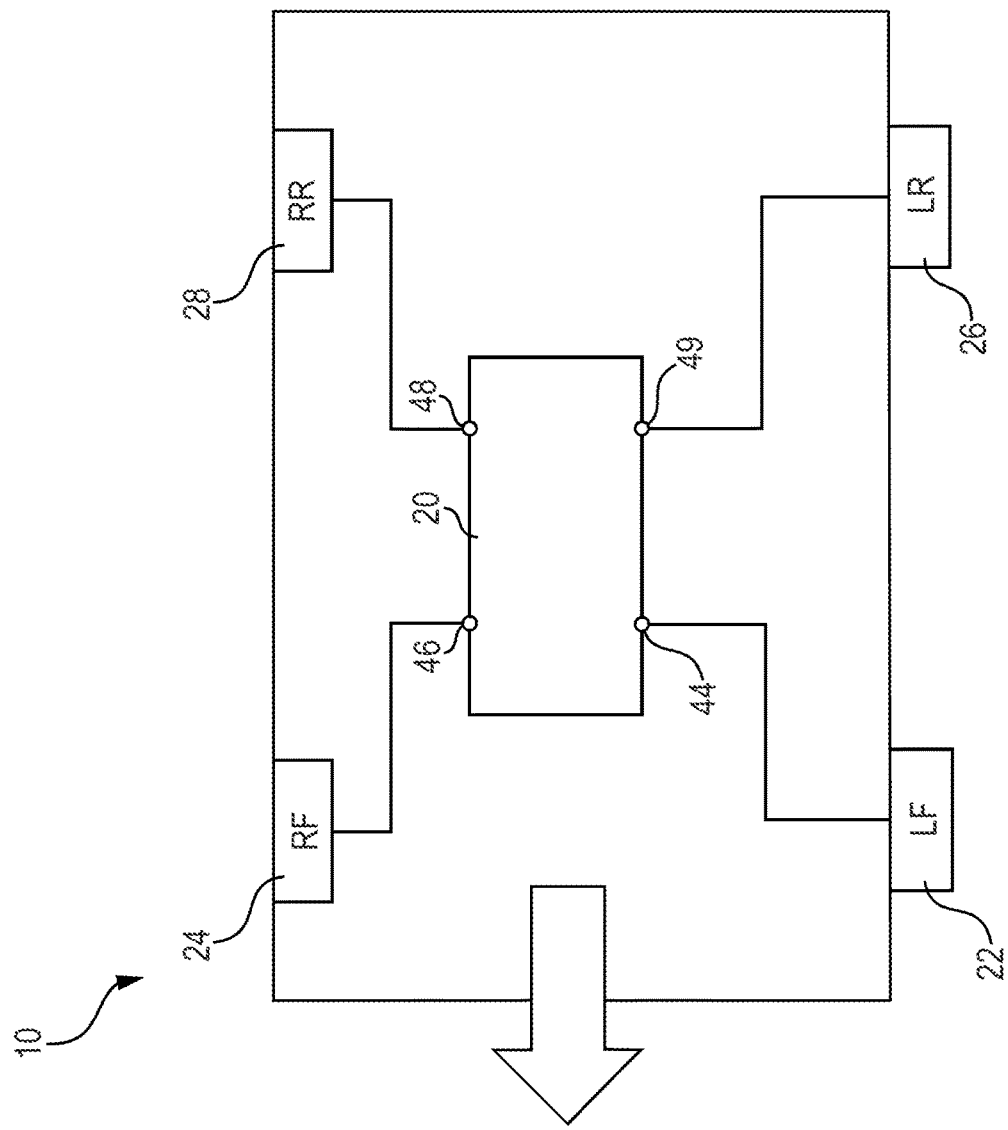
FIG. 1 shows a schematic top view of a vehicle.

Referring to the Figures, wherein like numerals indicate corresponding parts throughout the several views, a vehicle 10 with an electro-hydraulic brake assembly 20 constructed in accordance with one embodiment of the present invention is generally shown in FIG. 1. The vehicle 10 may be an automobile having four wheel brakes 22, 24, 26, 28 including a pair of front wheel brakes 22, 24 and a pair of rear wheel brakes 26, 28. The electro-hydraulic brake assembly 20 is connected to the front wheel brakes 22, 24 via first and second outlets 44, 46, respectively. The electro-hydraulic brake assembly 20 is connected to the rear wheel brakes 26, 28 via third and fourth outlets 48, 49, respectively.

The electro-hydraulic brake assembly 20 of the present disclosure does not include any onboard backup power source. In case of a failure that impacts powered braking, the electro-hydraulic brake assembly 20 of the present disclosure may rely upon the driver of the vehicle to manually apply the brakes. Therefore, the electro-hydraulic brake assembly 20 of the present disclosure may be limited to SAE autonomy levels 0-2.

Figure 2:
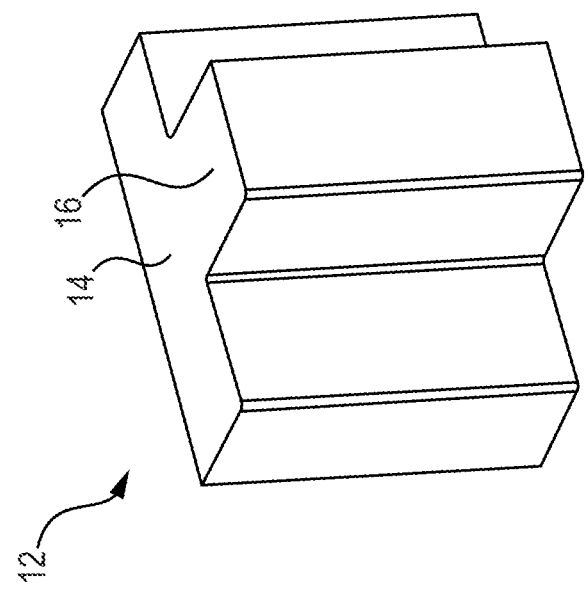
FIG. 2 shows a perspective view of a blank for an HCU body of an electro-hydraulic brake assembly.

FIG. 2 shows a perspective view of a blank 12 for the electro-hydraulic brake assembly 20. The blank 12 may be formed of extruded metal, such as aluminum. The blank 12 has a constant cross-section along a height, which may be provided by the extruding process. The blank 12 has a generally T-shaped cross-section, with a rectangular solid portion 14 corresponding to the cross-bar of the generally T-shaped cross-section, and with a bar-shaped portion 16 extending outwardly from a longer side face of the rectangular solid portion 14.

Figure 3:
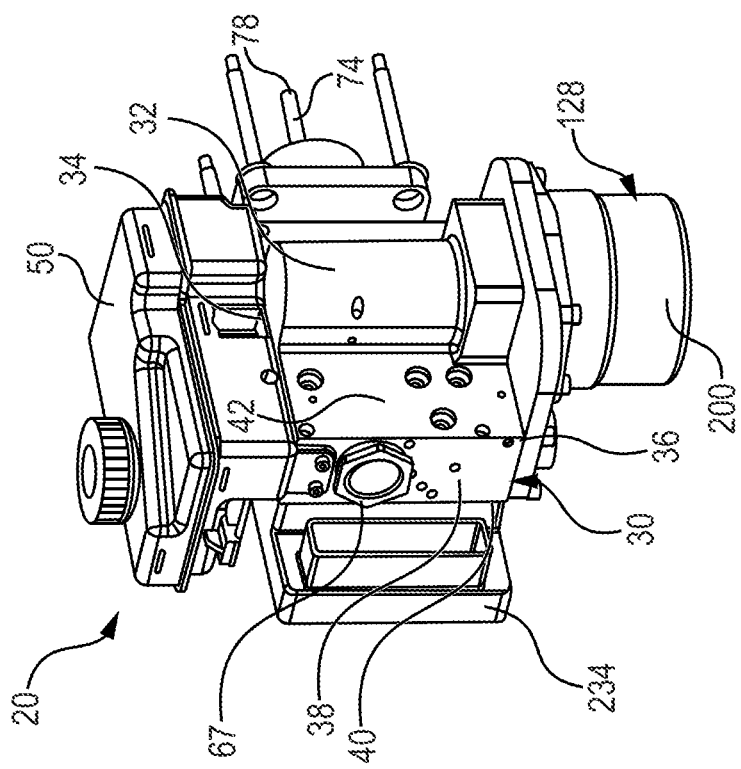
FIG. 3 shows a perspective view of an electro-hydraulic brake assembly according to an embodiment of the present invention.

Referring to FIG. 3, the electro-hydraulic brake assembly 20 is a one-box system including a hydraulic control unit (HCU) body 30 formed from the blank 12 and having a generally rectangular portion corresponding to the rectangular solid portion 14 that includes a top surface 34, a bottom surface 36, a pair of side surfaces 38, a front surface 40 and a rear surface 42. The top surface 34 and the bottom surface 36 are opposite and spaced from one another. The side surfaces 38 are opposite and spaced from one another. Each of the side surfaces 38 connect the top surface 34 and the bottom surface 36 to one another, establishing the rectangular shape. The front surface 40 and the rear surface 42 each connect to the top and the bottom surfaces 34, 36, and the side surfaces 38. The front surface 40 and the rear surface 42 are perpendicular to each of the top surface 34, the bottom surface 36, and the side surfaces 38. The side surfaces 38 are each perpendicular to each of the top surface 34 and the bottom surface 36. The HCU body 30 also includes a protrusion 32 extending outwardly from the rear surface 42 and extending upwardly from the bottom surface 36. The protrusion 32 is formed from the bar-shaped portion 16 of the blank 12. The electro-hydraulic brake assembly 20 includes a pressure supply unit 128 having a motor 200, such as a DC or AC electric motor attached to the bottom surface 36 of the HCU body 30 and aligned with the protrusion 32.

The HCU body 30 also incorporates components from a manifold block (or vehicle stability control unit), which makes the electro-hydraulic brake assembly 20 more compact. In other words, the HCU body 30 defines the plurality of outlets 44, 46, 48, 49 in fluid communication with the wheel brakes 22, 24, 26, 28, respectively, for supplying brake fluid from the HCU body 30 to the wheel brakes 22, 24, 26, 28 of the vehicle.

A fluid reservoir 50 disposed on the top surface 34 of the HCU body 30 for containing and supplying a brake fluid to the electro-hydraulic brake assembly 20. As shown in FIG. 9, the top surface 34 of the HCU body 30 defines a first hole 52, a second hole 54, and a third hole 56, each having a generally circular shape and spaced apart from one another. The holes 52, 54, and 56 are in fluid communication with the fluid reservoir 50 to allow fluid transfer between the fluid reservoir 50 and the HCU body 30. In some embodiments, and as shown in FIG. 9, one of the side surfaces 38 defines a first master cylinder (MC) bore 57, that extends into the HCU body 30. The first MC bore 57 may have a cylindrical shape or a generally cylindrical shape, although other shapes may be used, such as two or more cylinders in a stepped configuration.

Figure 4:
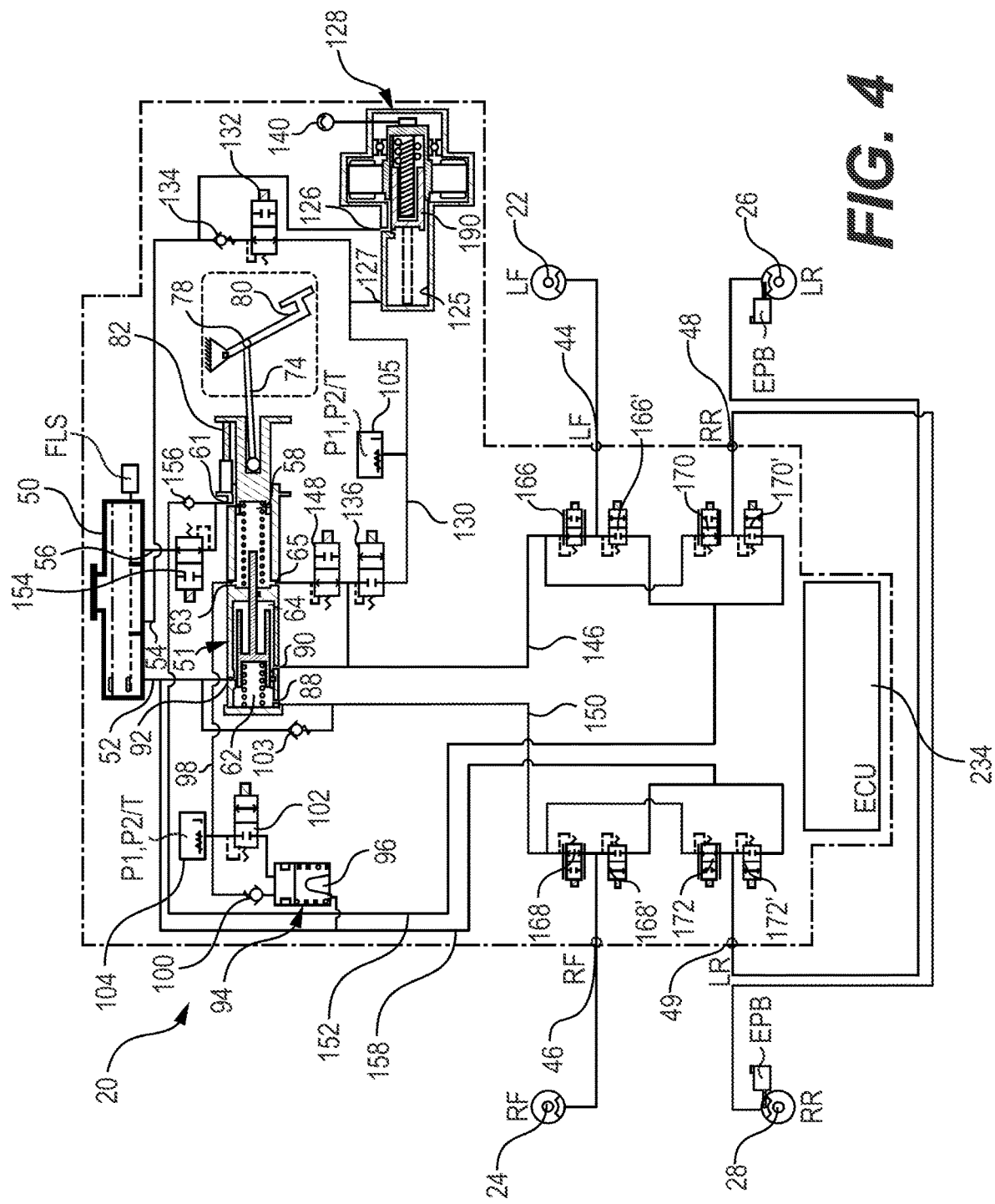
FIG. 4 shows a schematic diagram of an electro-hydraulic brake assembly according to an embodiment of the present invention.
Figure 5:
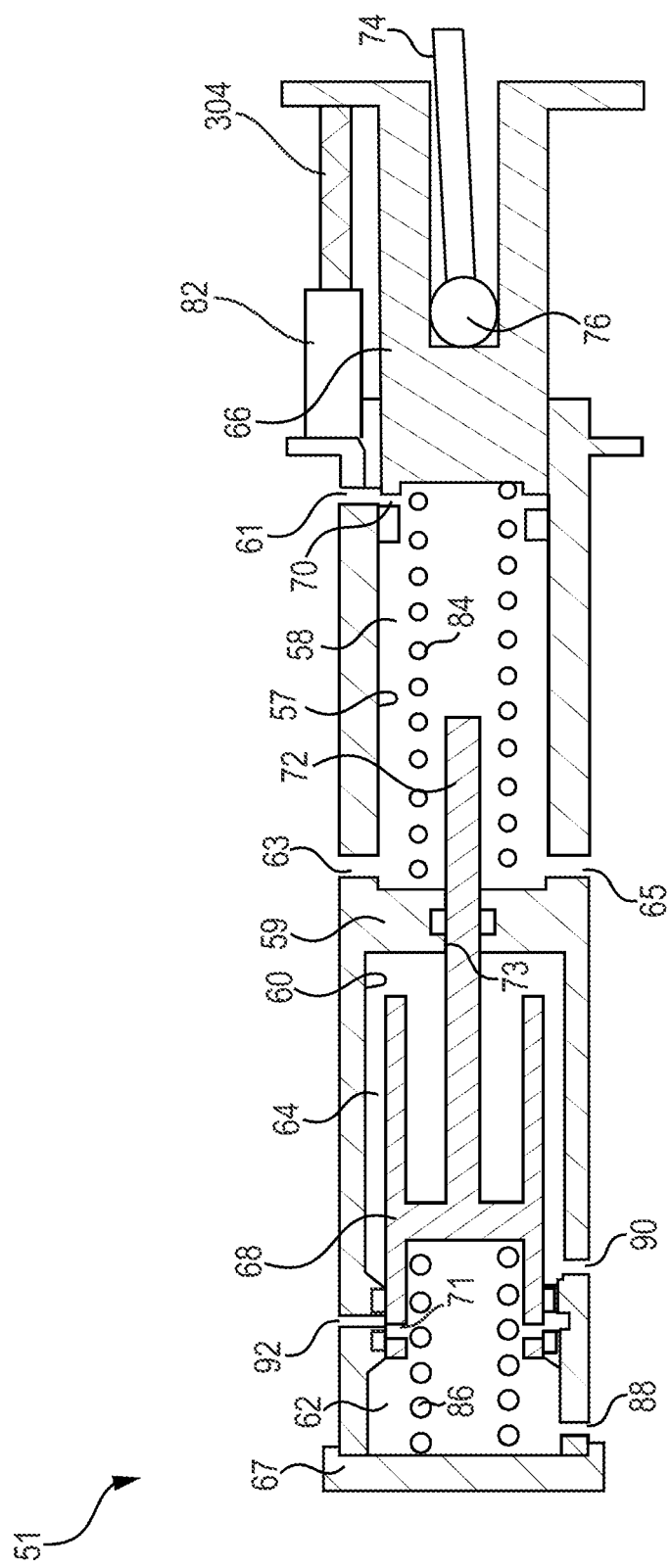
FIG. 5 shows an enlarged portion of the schematic diagram of FIG. 4.
Figure 7:
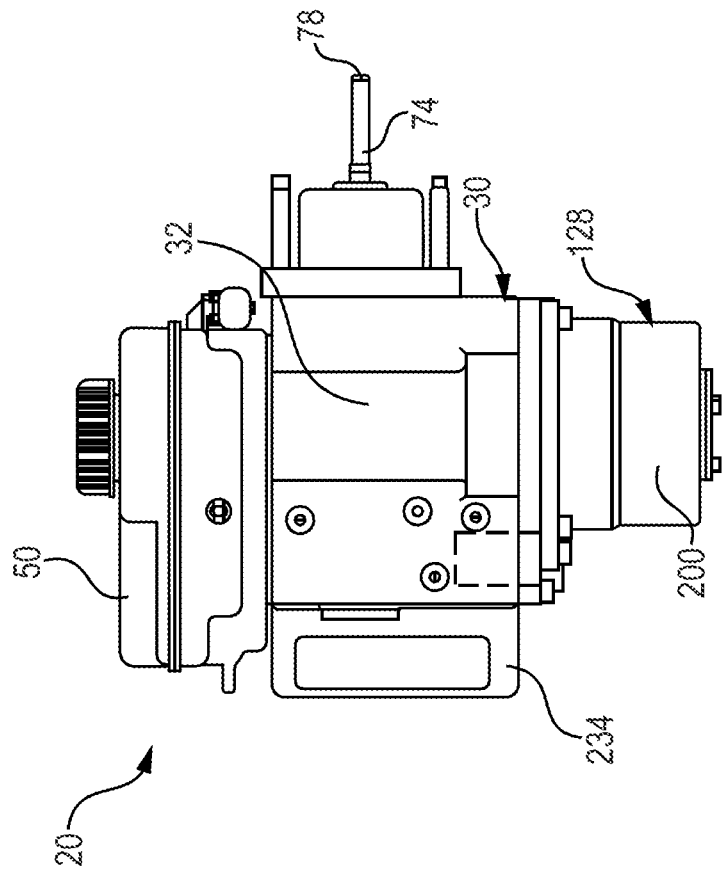
FIG. 7 shows a side view of the electro-hydraulic brake assembly of FIG. 3.

Referring now to FIGS. 4-5, the electro-hydraulic brake assembly 20 includes a master brake cylinder 51. The first MC bore 57 extends along the HCU body 30 parallel to the top and bottom surfaces 34, 36 between the corresponding one of the side surfaces 38 and a partition 59. The master brake cylinder 51 includes the first MC bore 57 defining a first fluid port 61, a second fluid port 63, and a third fluid port 65. The first fluid port 61 is spaced apart from the partition 59, and the second and third fluid ports 63, 65 are each located adjacent to the partition 59. A second MC bore 60, having a cylindrical shape, is also formed in the HCU body 30. The second MC bore 60 extends in-line with the first MC bore 57 between the partition 59 and an opposite one of the side surfaces 38 from the first MC bore 57, where an MC cap 67 encloses the second MC bore 60. The HCU body 30 defines a fourth fluid port 88, a fifth fluid port 90, and a sixth fluid port 92, each providing fluid communication into the second MC bore 60. The fourth fluid port 88 is located adjacent to the MC cap 67. The fifth fluid port 90 is located between the MC cap 67 and the partition 59, and the sixth fluid port 92 is located between the fourth and fifth fluid ports 88, 90.

A primary piston 66 and a secondary piston 68 are disposed in a tandem relationship with one another. The primary piston 66 is slidably disposed in the first MC bore 57, and the secondary piston 68, is slidably disposed in the second MC bore 60. The primary piston 66 defines a primary chamber 58 that extends between the primary piston 66 and the partition 59. The secondary piston 68 has a generally H-shaped cross-section and divides the second MC bore 60 into a first compartment 62 and a second compartment 64. The first compartment 62 extends between the secondary piston 68 and a side surface 38 of the HCU body 30. The second compartment 64 extends between the secondary piston 68 and the partition 59. The primary piston 66, has a generally H-shaped cross-section. The primary piston 66 defines a first aperture 70 for regulating flow of brake fluid from the first fluid port 61 and into the primary chamber 58, only allowing fluid flow therethrough when the primary piston 66 is in a retracted position. The secondary piston 68 defines a second aperture 71 for regulating flow of brake fluid from the sixth fluid port 92 into the first compartment 62, only allowing fluid flow therethrough when the secondary piston 68 is in a retracted position.

The secondary piston 68 includes a shaft 72 extending through a hole 73 in the partition 59, and into the primary chamber 58 for engagement with the primary piston 66. In another arrangement, instead of the two pistons 66, 68 being disposed in a tandem relationship with one another. Alternatively, aspects of the present disclosure may be used with a single-piston master brake cylinder.

A push rod 74 extends between a first end 76 and a second end 78 for moving the pistons 66, 68 in response to pressing of a brake pedal 80. The first end 76 of the pushrod 74 is coupled to the primary piston 66, and the second end 78 is coupled to the brake pedal 80 for allowing a user to move the pistons 66, 68.

A pedal travel sensor 82 connects to the pedal 80 for sensing and determining a linear position of the primary piston 66 resulting from pressing force applied to the brake pedal 80. A fluid level sensor FLS monitors fluid level in the fluid reservoir 50. The fluid level sensor FLS may include, for example, a float switch indicating a low level in the fluid reservoir 50.

A first spring 84 is located in the primary chamber 58, extending between the partition 59 and the primary piston 66 for biasing the primary piston 66 away from the partition and to a retracted position. A second spring 86 is located in the first compartment 62 extending between the MC cap 67 and the secondary piston 68 for biasing the secondary piston 68 away from the MC cap 67 and to its retracted position.

Referring now to FIG. 4, a pedal feel emulator (PFE) 94 is disposed in fluid connection with the first fluid port 61 of the master brake cylinder 51 for providing a resistance force to the primary piston 66. The pedal feel emulator 94 includes a pedal feel accumulator 96 for providing a prescribed resistance to the pressure from the driver's foot, a pedal feel line 98, a pedal feel check valve 100, and a PFE isolation valve 102. The pedal feel line 98 extends between the pedal feel accumulator 96 and the first fluid port 61 connecting the pedal feel emulator 94 with the master brake cylinder 51 to establish the resistance force. The pedal feel check valve 100 is configured to allow fluid flow from a top side of the pedal feel accumulator 96 to the primary chamber 58 of the master brake cylinder 51, while preventing flow in an opposite direction. The PFE isolation valve 102 is located in a parallel relationship with the pedal feel check valve 100. A PFE pressure sensor 104 is configured to monitor fluid pressure in the pedal feel line 98.

Figure 19:
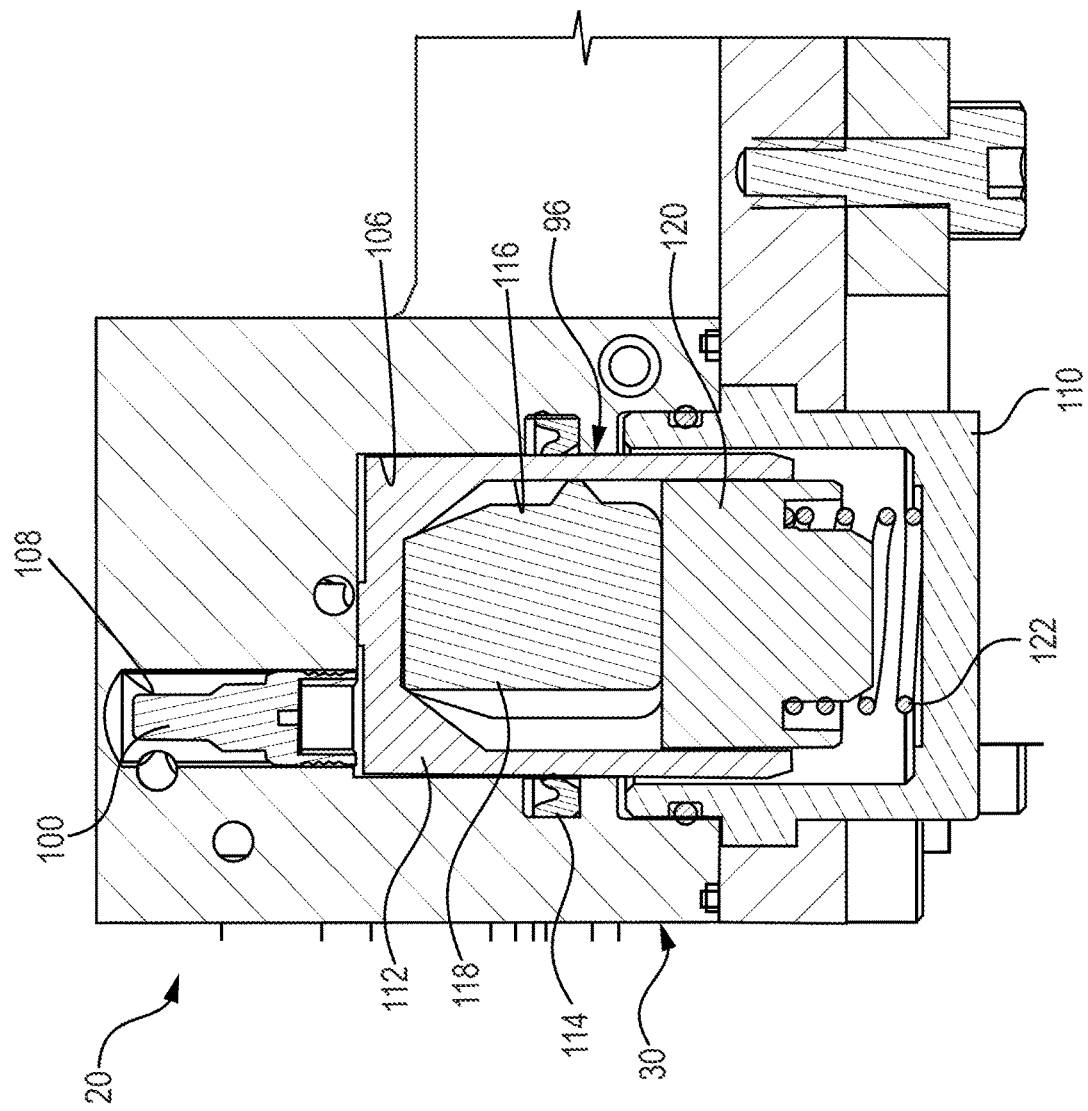
FIG. 19 shows an enlarged cross-sectional view of a pedal feel accumulator of the electro-hydraulic brake assembly of FIG. 3.

Referring now to FIG. 19, the HCU body 30 defines a PFE bore 106 and a recess 108 for receiving the pedal feel accumulator 96. The recess 108 is in communication with the PFE bore 106. More specifically, an innermost part of the PFE bore 106 defines the recess 108, which is shown as being located off-center and having a smaller diameter than the PFE bore 106. According to an embodiment of the present invention, the pedal feel check valve 100 is located in the recess 108 and the pedal feel accumulator 96 is at least partially disposed in the PFE bore 106. A retainer 110 couples to the HCU body 30 to secure the pedal feel accumulator 96 and the pedal feel check valve 100 in the PFE bore 106.

According to an embodiment of the present invention, the pedal feel accumulator 96 is a two-stage device that is efficiently integrated into the HCU body 30. The pedal feel accumulator 96 includes a main piston 112, having a generally U-shaped cross-section, slidably disposed in the PFE bore 106 for pushing the brake fluid in the PFE bore 106 to the master brake cylinder 51. A seal ring 114 extends about the main piston 112 to provide a fluid tight seal against the main piston 112. The main piston 112 defines a cavity 116 extending toward the retainer 110 and in communication with the PFE bore 106 of the HCU body 30. A rubber spring 118 is disposed in the cavity 116 in an abutment relationship with the main piston 112. A spring seat 120 is slidably disposed in the cavity 116 to sandwich the rubber spring 118 between the spring seat 120 and the main piston 112. A first stage spring 122 is located between the spring seat 120 and the retainer 110 to bias the rubber spring 118 and the spring seat 120 against the main piston 112.

Figure 6:
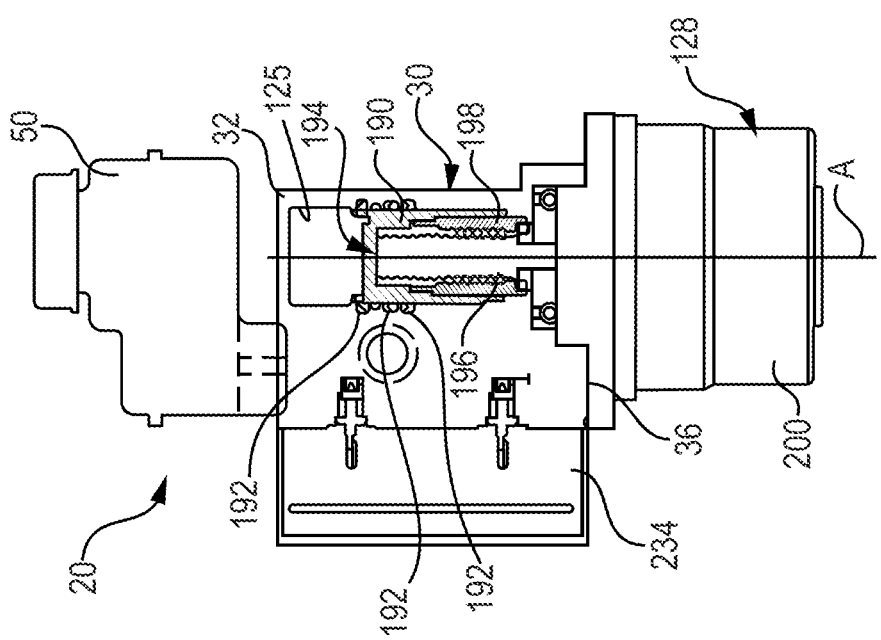
FIG. 6 shows a front cross-sectional view of the electro-hydraulic brake assembly of FIG. 3.

Referring back to FIGS. 4 and 6, the HCU body 30 defines a pressure supply bore 125, having a generally cylindrical shape, extending along a vertical axis A through the bottom surface 36 and within the protrusion 32. The HCU body 30 defines an inlet port 126 and an outlet port 127 in fluid communication with the pressure supply bore 125. The inlet port 126 is spaced apart from a terminal end of the pressure supply bore 125 and is in communication with the fluid reservoir 50 via the second hole 54 for providing fluid from the fluid reservoir 50 into the pressure supply bore 125. The outlet port 127 is located adjacent to the terminal end of the pressure supply bore 125 for conveying the fluid out of the pressure supply bore 125 and into a PSU fluid passageway 130. A PSU pressure sensor 105 is configured to monitor fluid pressure in the PSU fluid passageway 130.

A pressure supply unit 128 includes a motor 200 located on and attached to the bottom surface 36 of the HCU body 30, covering the pressure supply bore 125. The pressure supply unit 128 is in fluid communication with the fluid reservoir 50 and configured to supply brake fluid from the fluid reservoir 50 to the wheel brakes 22, 24, 26, 28 for decelerating the vehicle 10.

The electro-hydraulic brake assembly 20 includes an electronic control unit (ECU) 234 that is electrically connected to the various sensors FLS, 82, 104, 105, 140, solenoid valves 102, 132, 136, 148, 166, 166', 168, 168', 170, 170', 172, 172', and the motor 200 for coordinating operation of electro-hydraulic brake assembly 20.

The electro-hydraulic brake assembly 20 includes a PSU makeup valve 132 and a PSU check valve 134, disposed in series with one another, located between the PSU fluid passageway 130 and the fluid reservoir 50. The PSU makeup valve 132 may be a normally-opened type valve configured to allow fluid communication therethrough in case of a loss of electrical power. The PSU check valve 134 allows fluid flow from the fluid reservoir 50 to the PSU fluid passageway 130, while preventing fluid flow in an opposite direction. A motor position sensor 140 detects an rotational position of the motor 200, allowing the ECU 234 to determine a linear position of the pressure supply piston 190. On occasion during an ABS stop, it may be necessary for the pressure supply unit 128 to replenish the fluid in its pressure supply bore 125 since upon a wheel release, the release valves 168', 172', 166', and 170' direct fluid back to the fluid reservoir 50. In this sense, the pressure supply unit 128 is acting as a hydraulic pump. By retracting the pressure supply piston 190, fluid is drawn through check valve 134 and PSU makeup valve 132 refill the PSU bore 125. The master brake cylinder 51 also has a first compartment 62 which must be replenished independently of the pressure supply unit bore 125. To fill the first compartment 62, the PSU makeup valve 132 is closed, other valves are properly sequenced, and the pressure supply piston 190 of the pressure supply unit 128 is displaced towards the motor 200 to enable a pressure drop in second compartment 64 causing secondary piston 68 to retract, and thus enable a replenishment in first compartment 62 by drawing in fluid through check valve 103.

A first supply fluid passageway 146 supplies brake fluid to the left front wheel brake 22 and the right rear wheel brake 28. A second supply fluid passageway 150 supplies brake fluid to the right front wheel brake 24 and the left rear wheel brake 26. An MC isolation valve 148 selectively controls fluid communication between the primary chamber 58 of the master brake cylinder 51 and the first supply fluid passageway 146. The MC isolation valve 148 may be a normally-opened type valve configured to allow fluid communication therethrough in case of a loss of electrical power. A PSU isolation valve 136 selectively controls fluid communication between the PSU fluid passageway 130 and the first supply fluid passageway 146. The PSU isolation valve 136 may be a normally-closed type valve for closing the fluid flow from the pressure supply unit 128 in case of a loss of electrical power. The PSU valve 136 allows the electro-hydraulic brake assembly 20 to fluidly decouple the PSU 128 in response to a failure of the PSU 128.

A reservoir test valve 154 and a flow check valve 156 are each located between the third hole 56 of the fluid reservoir 50 and the first fluid port 61 of the master brake cylinder 51 and in a parallel relationship with one another. The reservoir test valve 154 is a normally open valve. The flow check valve 156 allows fluid flow from the reservoir 50 into the first fluid port 61 of the master brake cylinder 51, while blocking fluid flow in an opposite direction.

The HCU body 30 also includes a stability control unit disposed therein for supplying the brake fluid to the wheel brakes 22, 24, 26, 28 of the vehicle. The outlets 44, 46, 48, 49 include a first outlet 44, a second outlet 46, a third outlet 48, and a fourth outlet 49, spaced from one another. The first outlet 44 is in fluid communication with a left front wheel brake 22. The second outlet 46 is in fluid communication with a right front wheel brake 24. The third outlet 48 is in fluid communication with a left rear wheel brake 26. The fourth outlet 49 is in fluid communication with a right rear wheel brake 28. A first return line 152 allows fluid to return from the left front wheel brake 22 and the right rear wheel brake 28 to the fluid reservoir 50 via the third hole 56. A second return line 158 allows fluid to return from the right front wheel brake 24 and the left rear wheel brake 26 to the fluid reservoir 50 via the first hole 52.

The electro-hydraulic brake assembly 20 includes eight stability valves 166, 166', 168, 168', 170, 170', 172, 172' for controlling the flow of the brake fluid and varying the brake fluid pressure at the wheel brakes 22, 24, 26, 28. The stability valves 166, 166', 168, 168', 170, 170', 172, 172' may collectively be called antilock brake system (ABS) valves for their use in such an ABS. However, the stability valves 166, 166', 168, 168', 170, 170', 172, 172' may be used for other functions, such as for traction control and/or for torque vectoring. A left-front apply valve 166 selectively controls fluid flow from the first supply fluid passageway 146 to the left-front wheel brake 22. A left-front release valve 166' selectively controls fluid flow from the left-front wheel brake 22 to the fluid reservoir 50 via the first return line 152. A right-front apply valve 168 selectively controls fluid flow from the second supply fluid passageway 150 to the right-front wheel brake 24. A right-front release valve 168' selectively controls fluid flow from the right-front wheel brake 24 to the fluid reservoir 50 via the second return line 158. A right-rear apply valve 170 selectively controls fluid flow from the first supply fluid passageway 146 to the right-rear wheel brake 28. A right-rear release valve 170' selectively controls fluid flow from the right-rear wheel brake 28 to the fluid reservoir 50 via the first return line 152. A left-rear apply valve 172 selectively controls fluid flow from the second supply fluid passageway 150 to the left-rear wheel brake 26. A left-rear release valve 172' selectively controls fluid flow from the right-front wheel brake 26 to the fluid reservoir 50 via the second return line 158.

Referring to FIGS. 4-12, the pressure supply unit (PSU) 128 includes a pressure supply piston 190 slidably disposed in the pressure supply bore 125 for supplying the brake fluid into a PSU fluid passageway 130. A plurality of O-rings 192 are located in the pressure supply bore 125 extending annularly about and in sealing engagement with the pressure supply piston 190. An actuator mechanism 194 couples to the pressure supply piston 190 for moving the pressure supply piston 190 along the pressure supply bore 125.

Figure 8:
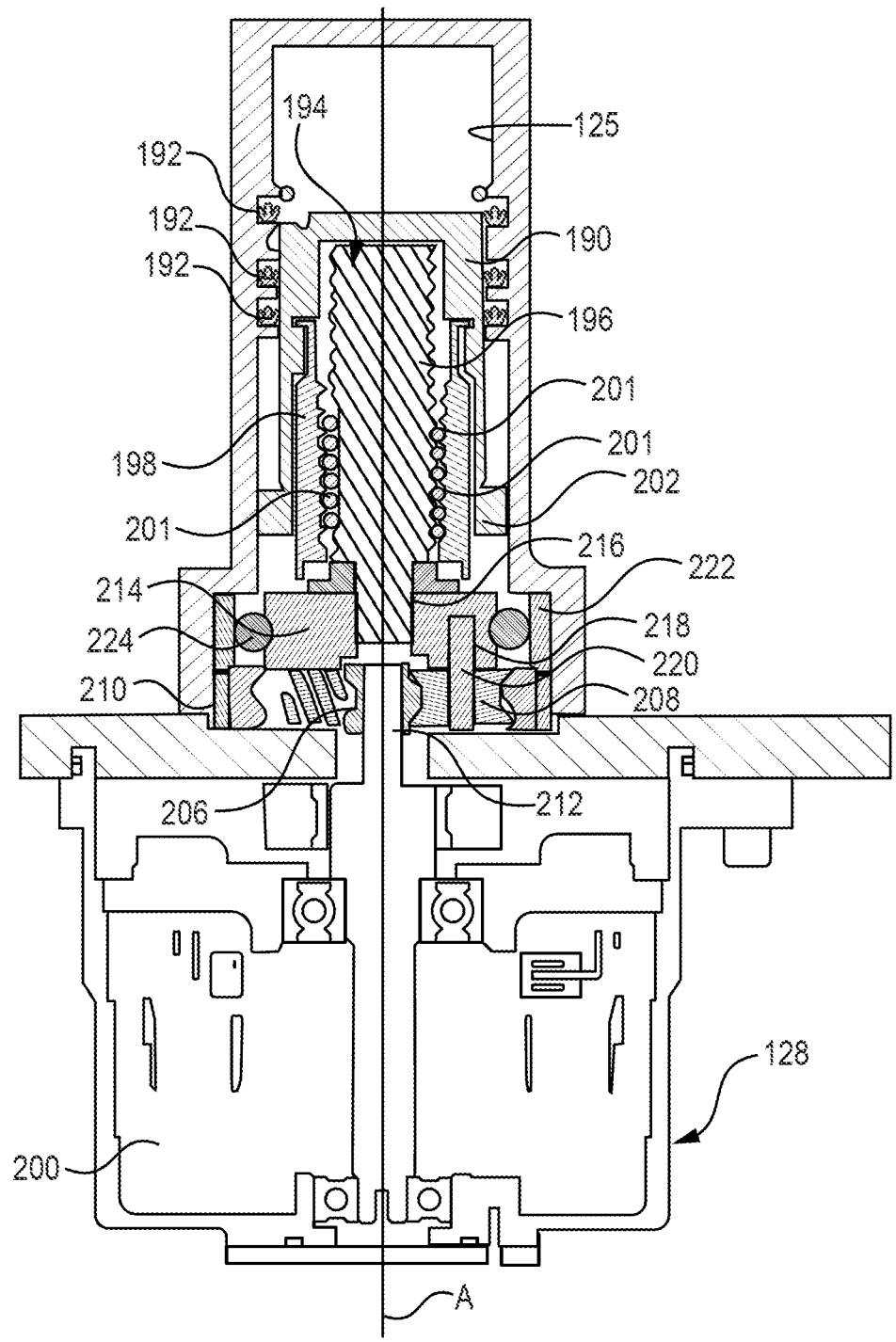
FIG. 8 shows a cross-sectional perspective view of the electro-hydraulic brake assembly of FIG. 3.
Figure 15:
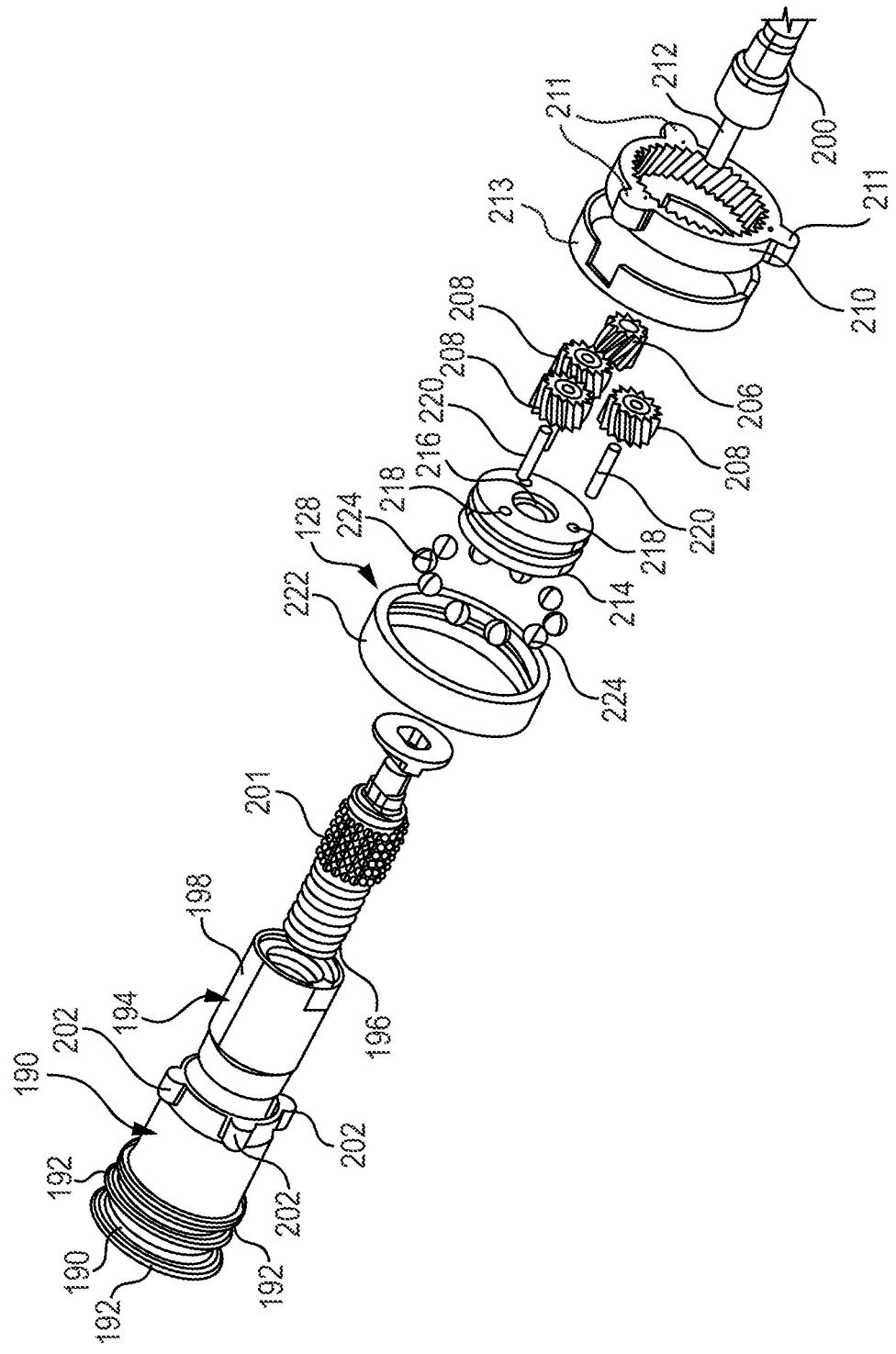
FIG. 15 shows an exploded view of a pressure supply unit of the electro-hydraulic brake assembly of FIG. 3.

As best illustrated in FIGS. 8 and 15, the actuator mechanism 194 includes a threaded shaft 196 and a nut 198. The threaded shaft 196 extends along the pressure supply bore 125 radially spaced apart from the pressure supply piston 190. The nut 198 extends about the threaded shaft 196 coupled to the pressure supply piston 190. A motor 200 is coupled to the threaded shaft 196 for rotating the threaded shaft 196. A plurality of spherical members 201 are located between the nut 198 and the threaded shaft 196 for transferring rotation of the threaded shaft 196 to an axial displacement of the nut 198. The axial displacement of the nut, thus, causes an axial movement of the pressure supply piston 190 through the pressure supply bore 125. The nut 198 may be attached to the pressure supply piston 190 to move together through the pressure supply bore 125. For example, the nut 198 may be attached to the pressure supply piston 190 by a threaded connection, a fastener, and/or using an adhesive or weld. In some embodiments, the nut 198 may be integrally formed with the pressure supply piston 190.

As shown in FIG. 15, a plurality of anti-rotational members 202 circumferentially spaced apart from one another, extend radially outwardly from the pressure supply piston 190. A planetary gear set 206, 208, 210 couples the motor shaft 212 to the threaded shaft 196 to rotate the threaded shaft 196 at a slower rotational speed than a rotational speed of the motor shaft 212. The planetary gear set 206, 208, 210 also, therefore, causes a corresponding increase in torque applied to the threaded shaft 196. The planetary gear set 206, 208, 210 includes a sun gear 206, a plurality of planet gears 208, and a ring gear 210. The sun gear 206 couples to a motor shaft 212 of the motor 200 and rotates with the motor shaft 212. The planet gears 208 are disposed about the sun gear 206 and are in mesh engagement with the sun gear 206 for rotational movement about the sun gear 206. The ring gear 210 extends about the planet gears 208 coupled to the inner surface of the pressure supply bore 125 to allow the planet gears 208 to rotate about the sun gear 206. The ring gear 210 may be made of a polymer material, such as plastic, although other types of materials may be used. The ring gear 210 includes three ears 211, each having an arch shape extending radially outwardly from a peripheral edge of the ring gear 210 at regular angular intervals. The ears 211 may engage a corresponding structure in the HCU body 30 for preventing the ring gear 210 from rotating. In some embodiments, the ears 211 may fit within corresponding recesses in a ring gear retainer 213. The ring gear retainer 213 is a hoop-shaped part, which may be made of metal, and which may be press fit into the pressure supply bore 125 and disposed around an outer periphery of the ring gear 210. The interface between the ears 211 of the ring gear 210 and the corresponding recesses in the ring gear retainer 213 prevent the ring gear 210 from rotating.

A planet carrier 214, having a generally circular shape, is disposed in the pressure supply bore 125 and coupled to the planetary gear set 206, 208, 210 and the threaded shaft 196. The planet carrier 214 defines an opening 216 along an axis thereof, for receiving an end of the threaded shaft 196. The planet carrier 214 also defines a plurality of pin holes 218 radially spaced apart from the opening 216. A pin 220 extends through each of the pin holes 218 and through corresponding ones of the planet gears 208, thereby coupling the planet carrier 214 to the planet gears 208 and allowing the planet carrier 214 and the threaded shaft 196 to rotate with the planet gears 208. An outer ring 222 is coupled to an inner surface of the pressure supply bore 125 radially spaced from the planet carrier 214. A plurality of ball bearings 224 are located between the outer ring 222 and the planet carrier 214 for allowing the planet carrier 214 to rotate in the pressure supply bore 125. In other words, all of the components of the pressure supply unit are housed in the pressure supply bore 125 to create a high efficiency energy transfer from rotation of the motor shaft 212 to linear translation of the pressure supply piston 190 through the pressure supply bore 125.

Figure 16:
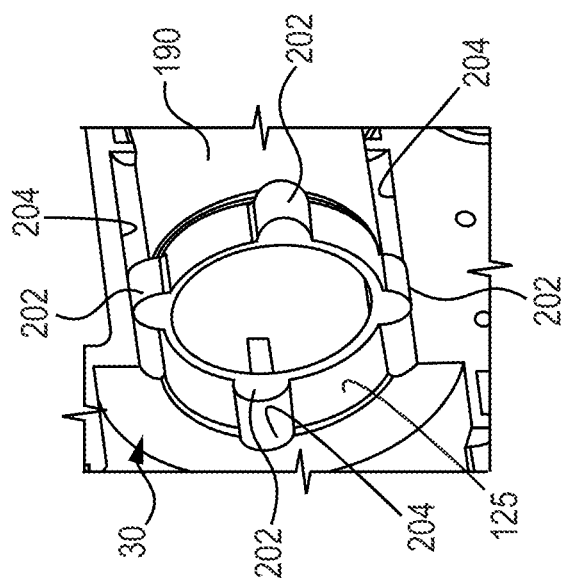
FIG. 16 shows a fragmentary view of a pressure supply piston of the pressure supply unit of the electro-hydraulic brake assembly of FIG. 3.

Referring now to FIG. 16, an inner surface of the pressure supply bore 125 defines a plurality of troughs 204, located about the inner surface of the pressure supply bore 125 and circumferentially spaced apart from one another. Each of the troughs 204 receives a corresponding one of the anti-rotational members 202 to prevent the pressure supply piston 190 from rotating in the pressure supply bore 125.

Figure 18:
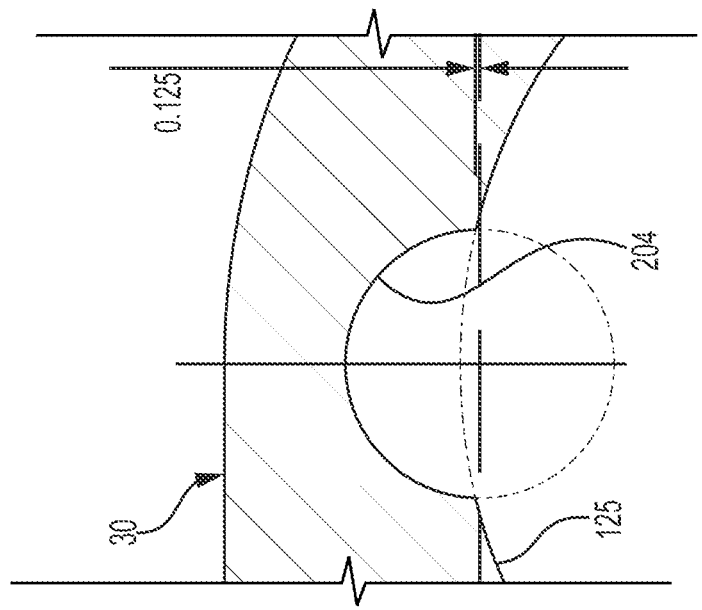
FIG. 18 shows an enlarged portion of the cross-section of FIG. 17.
Figure 17:
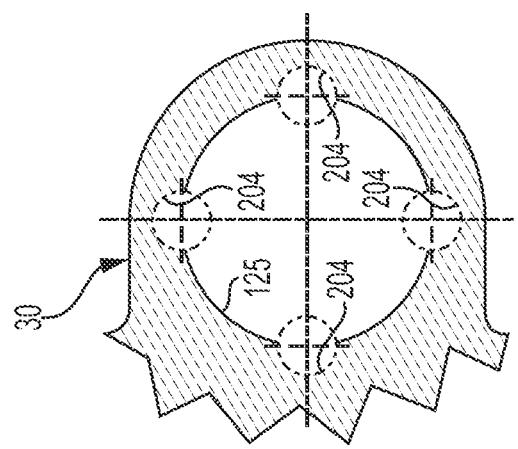
FIG. 17 shows a cross-section of a pressure supply bore in the protrusion of the electro-hydraulic brake assembly of FIG. 3.

Design details of the pressure supply bore 125 and the troughs 204 formed in the in the HCU body 30 are shown in FIGS. 16-18. According to an aspect of the disclosure, holes corresponding to each of the troughs 204 may first be drilled in the HCU body 30. After the holes corresponding to the troughs 204 are drilled, a larger hole may be formed in the HCU body 30, intersecting the holes corresponding to each of the troughs 204 and thereby forming the pressure supply bore 125. Forming the holes corresponding to the troughs 204, and the main circular hole of the pressure supply bore 125 may be a relatively low cost operation when compared to other techniques, such as broaching, that may otherwise be used. According to a further aspect of the disclosure, the holes corresponding to the troughs 204 may be centered upon a point slightly radially inwardly from a peripheral wall of the circular hole forming the pressure supply bore 125 (i.e. a radius of the larger circular hole forming the pressure supply bore 125). This positioning may eliminate the need for a corner break and still allow near maximum holding force. In some embodiments, the centerline of the holes corresponding to the troughs 204 may be located between 0.1 mm and 0.4 mm radially inwardly from the peripheral wall of the circular hole forming the pressure supply bore 125. In some embodiments, and as shown in FIG. 18, the distance between the centerline of the holes corresponding to the troughs 204 and the peripheral wall of the circular hole forming the pressure supply bore 125 may be 0.125 mm. The example embodiment shown in the figures includes four of the troughs 204, however, a different number of troughs 204 may be used.

Figure 14:
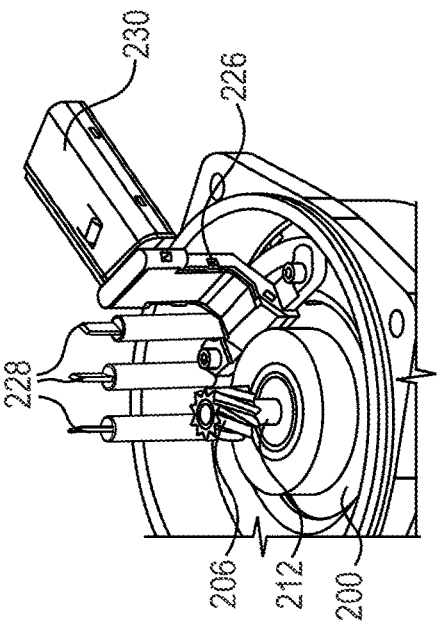
FIG. 14 shows a fragmentary view of the motor and the first motor connector.

As shown in FIG. 14, the motor 200 includes a first electrical connector 226 and a set of second electrical connectors 228. The first electrical connector 226 includes a plurality of terminals connected to the motor position sensor 140, which is located in the motor 200. The second electrical connectors 228 are connected to windings of the motor 200. The drawings show three of the second electrical connectors 228, corresponding to the motor 200 being a three-phase device having three sets of windings. However, the motor 200 may have a different number of second electrical connectors 228. For example, a single-phase electric motor may include only two second electrical connectors 228. The electrical conductors of the second electrical connectors 228 may be larger than corresponding conductors of the first electrical connector 226 for transmitting a higher amount of current for operating the motor 200. Each of the first electrical connector 226 and the second electrical connectors 228 extending outwardly from the motor 200 in a parallel relationship with the motor shaft 212.

Figure 13:
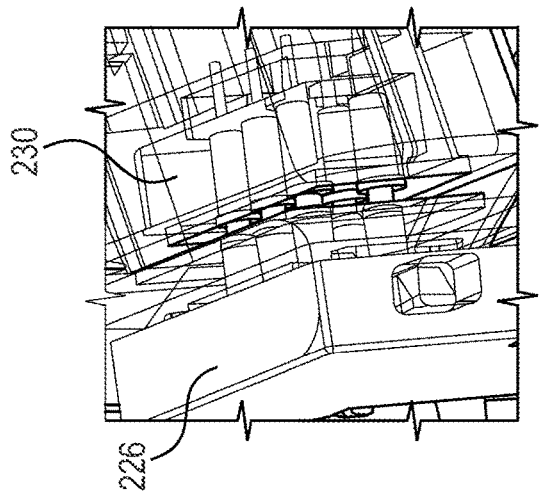
FIG. 13 shows an enlarged fragmentary view of the first motor connector.
Figure 11:
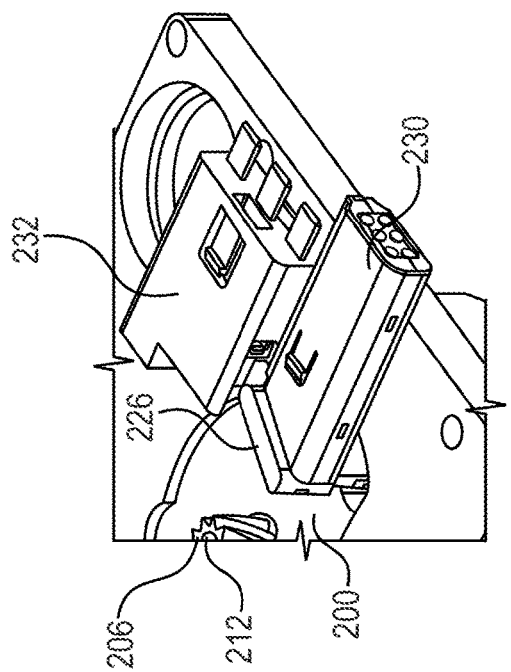
FIG. 11 shows an enlarged fragmentary view of a motor including a first motor connector and a second motor connector, according to an embodiment of the invention.
Figure 12:
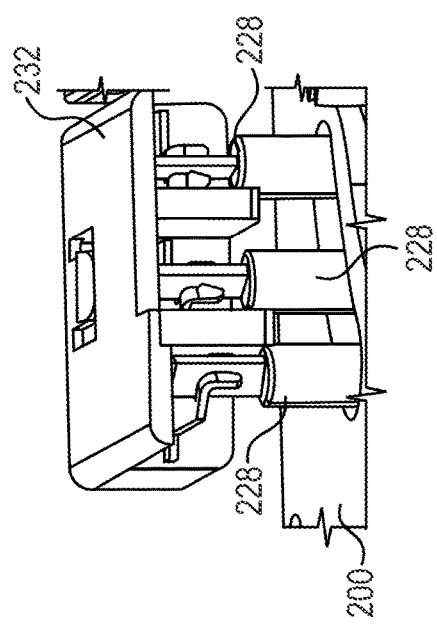
FIG. 12 shows an enlarged fragmentary view of the second motor connector.

FIG. 11 shows a first right-angle connector 230 connected to the first electrical connector 226. FIGS. 11-12 show a second right-angle connector 232 connected to the second electrical connectors 228. Each of the right-angle connectors may be located within the HCU body 30, as shown in FIG. 9, protruding from the front surface 40 for providing an electrical interface between the ECU 234 and a corresponding one of the motor 200 and the motor position sensor 140. FIG. 13 shows the first electrical connector 226 connecting to six conductors of the first right-angle connector 230 with a plug-and-pin interconnection. FIG. 12 shows the second right-angle connector 232 connecting to the second electrical connectors 228 of the motor 200 using fork-and-spade type interconnection.

FIG. 10 shows a first electrical coupling 236, 238 including a plurality of pads 236 on the first right-angle connector 230, and corresponding first spring-biased pins 238 of the ECU 234. The first spring-biased pins 238 may also be called pogo-pins. The ECU 234 includes the first spring-biased pins 238 configured to contact each of the pads 236, although only one of the first spring-biased pins 238 is shown on FIG. 10, for simplicity. FIG. 10 also shows a second electrical coupling 240, 242, including three flat terminals 240 of the second right-angle connector 232 protruding outwardly from the front surface 40 of the of the HCU body 30. The ECU 234 includes fork connectors 242 configured to contact corresponding ones of the flat terminals 240. The fork-and-spade type interconnection of the second electrical coupling 240, 242 is merely an example, and other electrical interconnections could be used. Each of the first electrical coupling 236, 238 and the second electrical coupling 240, 242 provides an electrical coupling between the motor 200 and the ECU 234 in a single-step operation, by attaching the ECU 234 to the front surface 40 of the HCU body 30.

FIGS. 20-26 show the electro-hydraulic brake assembly 20 including a pedal travel sensor 82 for measuring a linear position of the primary piston 66, and the brake pedal 80 connected thereto. FIG. 20 shows a side perspective view of the HCU body 30, with an input flange 300 attached to a side surface 38 thereof, for mounting the HCU body 30. The primary piston 66 of the master brake cylinder 51 extends through the input flange 300 for being pressed into the HCU body 30 by the brake pedal 80 (not shown in FIG. 20) via the push rod 74. FIG. 20 also shows the HCU body 30 defining a first sensor bore 302 that extends parallel to and spaced apart from the master cylinder bore 57.

The pedal travel sensor 82 includes a sensor rod 304 slidably disposed in the first sensor bore 302 and connected to move together with the primary piston 66 in respective ones of the first sensor bore 302 and the master cylinder bore 57. In other words, each of the sensor rod 304 and the primary piston 66 are each connected together so they each move together a same axial displacement in their respective one of the first sensor bore 302 and the master cylinder bore 57. In some embodiments, and as shown in FIG. 20, a retainer clip 306 connects the sensor rod 304 to the primary piston 66. The retainer clip 306 is disposed outside of the HCU body 30, at or adjacent to an axial end of each of the sensor rod 304 and the primary piston 66.

The HCU body 30 also defines a second sensor bore 310 extending perpendicularly to and adjacent to the first sensor bore 302 and intersecting the front surface 40. The pedal travel sensor 82 also includes a position detector 312 that is, at least partially, disposed within the second sensor bore 310 and configured to detect a position of the sensor rod 304 in the first sensor bore 302, and to thereby determine a position of the primary piston 66.

FIGS. 20-21 show the position detector 312 including a third right-angle connector 314 having a plurality of contact patches 316 for making electrical contact with corresponding second spring-biased pins 318 of the ECU 234 (not shown in these FIGS. 20-21). The third right-angle connector 314 may function similarly or identically to the first right-angle connector 230 to provide an electrical coupling between the pedal travel sensor 82 and the ECU 234 in a single-step operation, by attaching the ECU 234 to the front surface 40 of the HCU body 30.

In some embodiments, the sensor rod 304 has a varying magnetic flux along a length thereof. As shown in FIGS. 22-23, the position detector 312 includes a magnetic pickup 320 disposed adjacent to the first sensor bore 302 and configured to detect the position of the sensor rod 304 based on the varying magnetic flux of the sensor rod 304. The magnetic flux of the sensor rod 304 may define for example, a magnetic flux having a pattern, such as a waveform pattern or a pulse pattern that varies along the length of the sensor rod 304, and which is detected by the magnetic pickup 320 of the position detector 312. The position detector 312 may use another sensor type, which may be, for example magnetic, optical, mechanical, or electromechanical, to detect the linear position of the sensor rod 304. For example, the position detector 312 may include an encoder, a resolver, etc. to determine the linear position of the sensor rod 304. The position detector 312 also includes a printed circuit board 322 holding the magnetic pickup 320 and related circuitry for providing signals to the ECU 234 via the third right-angle connector 314.

As shown in FIG. 23, the magnetic pickup 320 may be located within the second sensor bore 310 adjacent to and spaced apart from the first sensor bore 302 (i.e. with a small amount of the HCU body 30 extending therebetween. Thus, any fluid entering the first sensor bore 302 may be prevented from contacting the position detector 312.

As shown in FIG. 24, a cap 330 attaches to the input flange 300 covering the sensor rod 304, the primary piston 66, and the retainer clip 306. The cap 330 defines an opening 332 for receiving the push rod 74 (not shown in FIG. 24). FIGS. 25-26 show cross-sectional details through planes A-A and B-B, respectively, as indicated on FIG. 24. In some embodiments, and as shown in FIG. 25, there is a loose fit between the retainer clip 306 and the sensor rod 304. This interface may prevent the sensor rod 304 from rotating, while also providing clearance to prevent binding.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The foregoing description is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be

What is claimed is:

1. An electro-hydraulic brake assembly comprising:
a hydraulic control unit (HCU) body including a top surface, a bottom surface opposite the top surface, a side surface, and a front surface, with the side surface and the front surface extending perpendicular to the top surface, the bottom surface, and to one another, the HCU body defining a pressure supply bore and a master cylinder bore;
a fluid reservoir disposed on the top surface of the HCU body;
an electronic control unit coupled to the front surface;
a primary piston slidably disposed in the master cylinder bore and configured to supply brake fluid to a wheel brake in response to pressing of a brake pedal; and
a pressure supply unit including a pressure supply piston disposed within the pressure supply bore, and a motor having a motor shaft configured to cause the pressure supply piston to translate linearly through the pressure supply bore;
wherein the master cylinder bore is defined in the side surface; and
wherein the motor is located on the bottom surface of the HCU body,
wherein the HCU body includes a generally rectangular portion defining the top surface, the bottom surface, the side surface, the front surface, and a rear surface disposed opposite the front surface;
wherein the HCU body further includes a protrusion extending outwardly from the rear surface and upwardly from the bottom surface; and
wherein the pressure supply bore is formed within the protrusion.

2. The electro-hydraulic brake assembly of claim 1, wherein the motor shaft extends perpendicularly to the bottom surface of the HCU body.

3. The electro-hydraulic brake assembly of claim 1, wherein the pressure supply bore extends along and about a vertical axis, and wherein the motor shaft rotates about the vertical axis in line with the pressure supply bore to cause the pressure supply piston to translate linearly along the vertical axis.

4. The electro-hydraulic brake assembly of claim 1, further comprising a pedal feel emulator disposed within the HCU body and fluidly coupled to the master cylinder bore.

5. The electro-hydraulic brake assembly of claim 1, wherein the HCU body is formed from a block of extruded metal having a T-shaped cross-section, with a crossbar of the T-shaped cross-section forming the generally rectangular portion, and with an upright portion of the T-shaped cross-section forming the protrusion.

6. The electro-hydraulic brake assembly of claim 1, further comprising an electrical coupling configured to electrically couple the electronic control unit with the motor in a single-step operation by attaching the electronic control unit to the front surface of the HCU body.

7. The electro-hydraulic brake assembly of claim 1, wherein the pressure supply unit further includes an actuator mechanism coupling the motor shaft to the pressure supply piston, the actuator mechanism including a threaded shaft configured to be rotated by the motor shaft and a nut coupled to the pressure supply piston, and a plurality spherical members located between the nut and the threaded shaft for transferring rotation of the threaded shaft to an axial displacement of the nut to cause the pressure supply piston to translate linearly through the pressure supply bore in response to rotation of the motor shaft.

8. An electro-hydraulic brake assembly comprising:
an HCU body including a top surface and a bottom surface opposite the top surface, the HCU body defining a master cylinder bore and a pressure supply bore, wherein the HCU body includes a generally rectangular portion defining the top surface, the bottom surface, a side surface, a front surface, and a rear surface disposed opposite the front surface, wherein the HCU body further includes a protrusion extending outwardly from the rear surface and upwardly from the bottom surface, and wherein the pressure supply bore is formed within the protrusion;
a piston slidably disposed in the master cylinder bore and configured to supply brake fluid to a wheel brake in response to pressing of a brake pedal; and
a pressure supply unit including:
a pressure supply piston disposed within the pressure supply bore;
a motor attached to the HCU body and having a motor shaft; and
an actuator mechanism configured to cause the pressure supply piston to translate linearly through the pressure supply bore in response to rotation of the motor shaft, the actuator mechanism including a threaded shaft configured to be rotated by the motor shaft and a nut coupled to the pressure supply piston, and a plurality spherical members located between the nut and the threaded shaft for transferring rotation of the threaded shaft to an axial displacement of the nut.

9. The electro-hydraulic brake assembly of claim 8, wherein the actuator mechanism further comprises a planetary gear set coupling the motor shaft to the threaded shaft.

10. The electro-hydraulic brake assembly of claim 8, wherein the actuator mechanism further comprises an anti-rotational member extending radially outwardly from one of the nut or the pressure supply piston and engaging a corresponding trough in the pressure supply bore.

11. The electro-hydraulic brake assembly of claim 10, wherein the anti-rotational member is one of a plurality of anti-rotational members, each extending radially outward from the pressure supply piston.

12. The electro-hydraulic brake assembly of claim 8, further comprising a pedal feel emulator disposed within the HCU body and fluidly coupled to the master cylinder bore.

13. The electro-hydraulic brake assembly of claim 8, further comprising an electronic control unit coupled to the front surface of the HCU body.

14. The electro-hydraulic brake assembly of claim 8, further comprising a fluid reservoir disposed on the top surface of the HCU body.

15. An electro-hydraulic brake assembly comprising:
an HCU body including a top surface and a bottom surface opposite the top surface and defining a master cylinder bore and a first sensor bore extending parallel to and spaced apart from the master cylinder bore, wherein the HCU body includes a generally rectangular portion defining the top surface, the bottom surface, a side surface, a front surface, and a rear surface disposed opposite the front surface, wherein the HCU body further includes a protrusion extending outwardly from the rear surface and upwardly from the bottom surface, and wherein the pressure supply bore is formed within the protrusion;

a primary piston slidably disposed in the master cylinder bore and configured to supply brake fluid to a wheel brake in response to pressing of a brake pedal;

a pedal travel sensor including a sensor rod slidably disposed in the first sensor bore and connected to move together with the primary piston in respective ones of the first sensor bore and the master cylinder bore; and the pedal travel sensor including a position detector configured to detect a position of the sensor rod in the first sensor bore, and to thereby determine a position of the primary piston.

16. The electro-hydraulic brake assembly of claim 15, further comprising the sensor rod having a varying magnetic flux along a length thereof, and the position detector including a magnetic pickup disposed adjacent to the first sensor bore and configured to detect the position of the sensor rod based on the varying magnetic flux of the sensor rod.

17. The electro-hydraulic brake assembly of claim 16, further comprising a second sensor bore disposed adjacent to the first sensor bore, with the magnetic pickup disposed in the second sensor bore.

18. The electro-hydraulic brake assembly of claim 17, wherein the second sensor bore extends perpendicularly to the first sensor bore.

19. The electro-hydraulic brake assembly of claim 15, further comprising a retainer clip disposed outside of the HCU body and connecting the sensor rod to the primary piston.

\* \* \* \* \*